Nov. 28, 1961   H. W. SHUMAKER   3,010,754
REAR END WIND DEFLECTOR FOR VEHICLES
Filed April 22, 1960   2 Sheets-Sheet 1
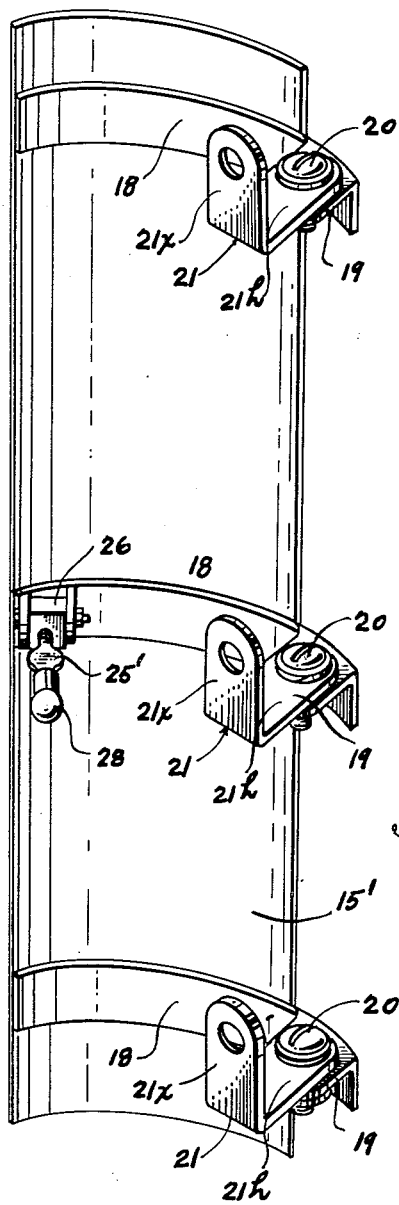
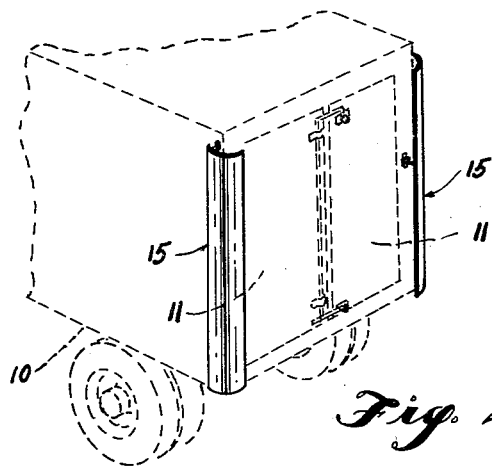
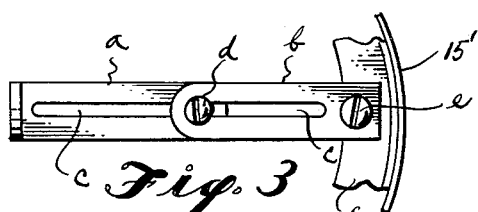
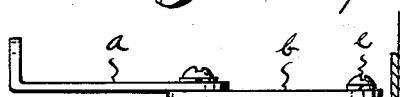
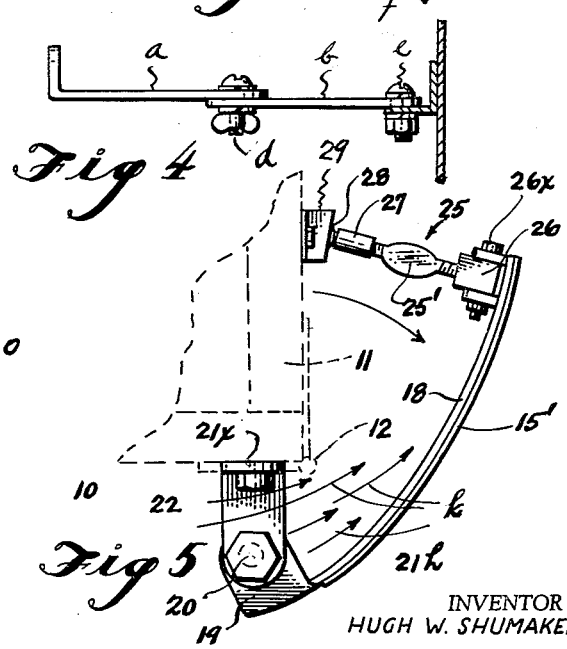
INVENTOR
HUGH W. SHUMAKER
BY Robinson & Berry
ATTORNEYS

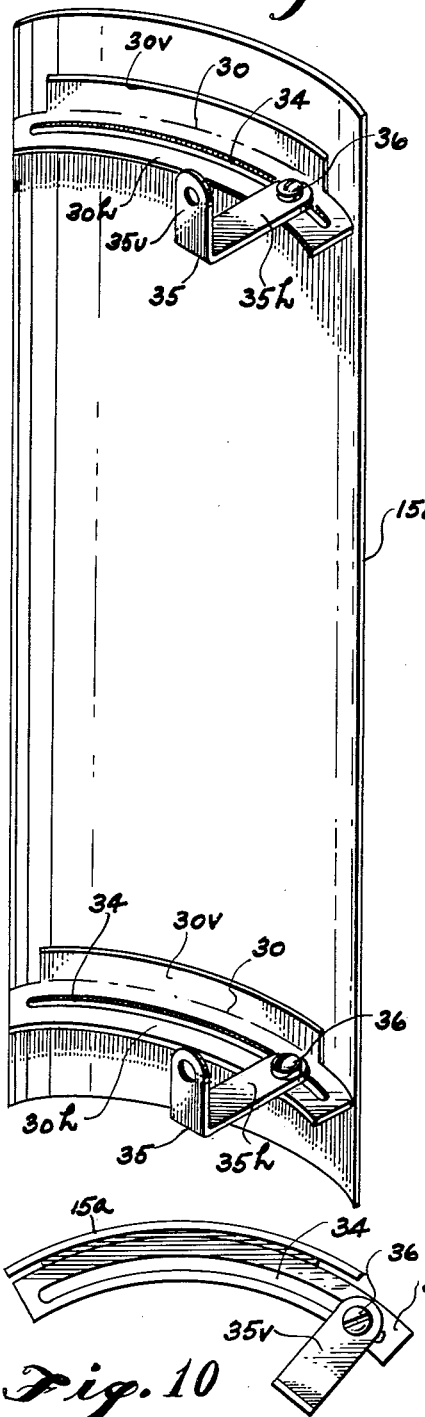
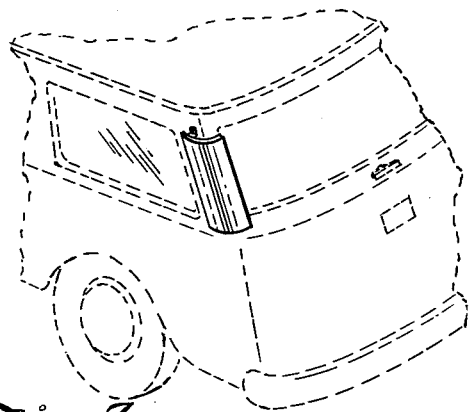
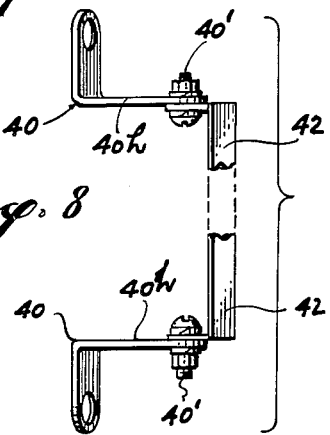
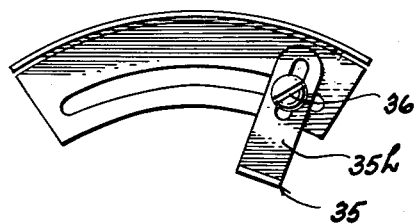
INVENTOR
HUGH W. SHUMAKER

United States Patent Office 3,010,754
Patented Nov. 28, 1961

3,010,754
REAR END WIND DEFLECTOR FOR VEHICLES
Hugh W. Shumaker, 517 S. Jackson St., Moscow, Idaho
Filed Apr. 22, 1960, Ser. No. 23,950
3 Claims. (Cl. 296—1)

This invention relates to wind deflectors as applied to motorized highway vehicles. More particularly, it relates to wind deflectors as designed and applied for use to the present day types of vans, closed body furniture trucks, and the like, for the deflection of slip stream air from the side walls of the van or truck body, to direct it across the rear end wall thereof to keep this wall free of dust or dirt that otherwise would, incident to travel of the vehicle along a road or highway, be sucked or drawn to and caused to settle on the end wall, doors and windows of the wall. However, it is not the intent that the present invention be confined in use to any particular kind or form of highway vehicle, but that its application shall extend to any vehicle with which its use is satisfactory for its intended purposes.

Further objects of the present invention reside in the details of construction; the mode of application and use of the deflectors; in the provision and combination of novel mounting brackets and adjusting linkage for the deflectors for obtaining proper angular setting or adjustment thereof.

In accomplishing these and other objects of the invention, I have provided the improved details of construction, the preferred forms of which are illustrated in the accompanying drawings, wherein:

FIG. 1 is a perspective view of a wind deflector of the present invention, as seen from the inside thereof, and particularly illustrating its mounting brackets and adjustment retaining linkage.

FIG. 2 is a perspective view, showing the place of application of the present deflectors to the rear end, vertical corners of a truck or van body.

FIG. 3 is a top view of a two-piece, alternative form of adjustable mounting bracket suitable for use with deflectors of the kind shown in FIG. 1.

FIG. 4 is a side view of the bracket as shown in FIG. 3.

FIG. 5 is a plan, or upper end view of the deflector plate of FIG. 1 as adjustably mounted at the corner of a van body.

FIG. 6 is an inside perspective view of a wind deflector plate as equipped with adjustable mountings of an alternative form.

FIG. 7 is a perspective view, illustrating the manner of mounting deflectors of the present character at the rear end corners of a station wagon.

FIG. 8 illustrates, in perspective, paired upper and lower end brackets of an alternative form adapted to be used with deflectors of the present types.

FIG. 9 is a top end view of a deflector with flange as applied thereto for the mounting or securement of the deflector plate.

FIG. 10 is an end view of the deflector of FIG. 6.

Referring more in detail to the drawings:

In FIG. 2, I have represented, in dash lines, the rear end portion of a road vehicle with a closed body that is typical of that particular type for which the wind deflectors of the present invention are adapted for use. It is generally the case that the bodies, 10, of such vehicles are enclosed and are equipped at the rear end with paired, rearwardly opening doors 11—11. Usually such doors are hingedly mounted at their outer vertical edges, as at 12 in FIG. 5, to swing rearwardly and outwardly to the side of the body.

The present deflector, designated in its entirety by reference numeral 15, preferably is of such length as to extend to the full length of the rear end corner of the body when applied thereto as illustrated in FIG. 2. It has been shown in FIGS. 1 and 5 that the deflector plate 15′ is formed from a single continuous and straight strip of metal, or other suitable material, and is arcuately curved in its transverse direction to a convex formation as in FIG. 5, and is equipped at the inside, near its upper and lower ends and also at an intermediate level, with transverse stiffening strips 18 of metal which are spot welded or otherwise permanently and securely fixed to the deflector plates. Each of these three stiffening strips 18 terminates at one end even with the vertical or swingingly adjustable edge of the deflector plate, as well shown in FIGS. 1 and 5, but at their opposite ends they project equally beyond the corresponding plate edge, as shown. The top edge of each strip 18 is formed, along its projecting end portion, with a horizontally outturned ear 19. Each of these ears is pivotally attached by a vertical bolt 20 to the horizontal arm 21h of a mounting bracket 21. Each bracket 21 has a vertical leg 21x, fixed to the side wall of the vehicle body, as shown in FIG. 5, by a bolt 22 with the three pivot bolts 20 in axial alignment for easy hinging action of the plates.

The mounting of the deflector plates at opposite, rear end corners of the truck, or van body, is as indicated in FIG. 5, wherein it is to be observed that the deflector plate projects at its hingedly mounted edge, beyond the side wall surface of the vehicle body to provide for the pick-up and inward deflection of slip stream air, as has been indicated by the plurality of arrows $k$. The extent of lateral deflection of air is controlled by the plate setting. In the present instance the plate setting is adjustable and is controlled by a single turn-buckle type of linkage 25, best shown in FIG. 5, wherein it is shown that the link 25′ is threaded at its opposite ends, by left and right hand threads, respectively, into blocks 26 and 27 which are fixed, respectively, to the swinging edge of plate 15′ and to the corresponding truck door 11. It is to be observed that the block 26 is secured to the plate by a vertical pivot bolt 26x. The block 27 terminates at its outer end in a ball member 28 that is rotatively secured by suitable means in a ball socket formed in a block 29 that is fixed to the vehicle door as in FIG. 5. The air deflecting function of each plate may be increased or decreased in accordance with adjustment of this turn-buckle connection as will be understood by reference to FIG. 5.

The toggle type linkage shown in FIGS. 3 and 4 may be used in lieu of that shown in FIG. 5. It comprises two short links $a$ and $b$ that are longitudinally slotted, as at $c$, to receive a clamping bolt $d$ through the slots. One link is pivotally attached by a bolt $e$ to the flange $f$ on the backside of the deflector plate and the other link is adapted to be fixed at its end to the door 11. When an adjustment of the deflector plate 15′ is to be made, the bolt $d$ is loosened and the adjustment made and then secured by tightening the bolt.

It is shown in FIG. 5 that the plate 15′ is fixed by the linkage 25 to the door 11 at a short distance from the hinge 12. However, by reason of the pivotal connections of the linkage with the block, plate and door the opening and closing of the door may be accomplished without disturbing the normal setting of the plate.

The deflecting plate shown in FIG. 6 is substantially like that shown in FIG. 1, both in its application and mode of use. However, it is equipped with an alternative form of mounting. It is shown in FIG. 6 that the deflecting plate 15a is equipped, at its inside and at upper and lower ends, with transversely directed stiffening strips 30 of angle form; each strip having a vertical flange 30v that is disposed flatly against the inside surface of the plate and welded or otherwise securely fixed thereto. Also, each strip has a horizontal flange 30h formed substantially to its full length with a slot 34. Applied to each flange 30h is a plate mounting bracket 35 of right angle form, having a vertical inner end leg 35v designed to be bolted to the side wall of the truck body in the same relationship thereto as the plate supporting bracket 21 of FIG. 5 and having a horizontal arm 35h that, at its end, overlaps the slotted flange 30h and mounts a pivot bolt 36 that extends downwardly through the flange slot and can be tightened at a selected adjustment along this flange.

In the setting of this plate 15a, the pivot bolts 36 are first loosened, the plate shifted to a desired position of use and is then fixed for use by tightening the bolts. This particular plate mounting permits a greater range of adjustment than is provided for by the hinged mounting of FIG. 5, but must be so set as not to interfere with the swinging of rear end body doors if used on a vehicle of the type of FIG. 2.

FIG. 7 illustrates the mounting of deflector plates of the present character on a station wagon; it being understood that mounting brackets as shown in FIGS. 6, 9 or 10 may be used for this purpose. Attention is directed also to that feature, shown in the device of FIG. 10, that the horizontal flange 30h of the angular mounting strip 30 is extended at one end beyond the side edge of the deflector plate to enable the plate to be swung through a greater arc without bracket interference when the bracket is set out to the end of the slot 34, as in this view.

FIG. 8 illustrates paired upper and lower end brackets 40—40 of right angle form with horizontal legs 40h pivotally fixed by bolts 40' to opposite ends of a connecting strip 42 along which the deflector plate can be conveniently extended and secured. It is anticipated that, in the use of these paired brackets, they would be fixedly mounted on the vehicle body beyond the end limits of the deflector plate so that the mountings would not interfere with plate swinging adjustment.

FIG. 9 shows a plate mounting substantially like that of FIG. 6 with the exception that the horizontal arm of the supporting bracket 35 is longitudinally slotted to receive the clamping bolts thus to provide additional adjustability.

What I claim as new is:

1. A wind deflector for use on a highway vehicle of the character described having a body formed with a side wall and a rear end door hinged at its outer vertical edge to the rear end of the side wall to swing rearwardly and outwardly between closed and open positions; said deflector comprising an elongated wind deflecting plate, transversely curved to present a concaved wind deflecting surface, plate mounting brackets fixed, in vertical spacing, to said side wall adjacent the rear end corner of the body, inwardly directed supporting ears provided on said plate adjacent the upper and lower ends thereof, means hingedly fixing said ears to said mounting brackets for adjustment and support of the deflecting plate with its concaved surface faced forwardly and its outer edge projecting beyond the corner of the body to pick up and deflect slip stream air transversely across the rear end door, and an adjustable connecting link pivotally fixed at its ends to the inner edge portion of the plate and to said door at a point inwardly from the door mounting hinge to establish the normal angle of deflection of the plate when the door is closed and to cause the plate to swing outwardly with the opening of the door.

2. The deflector of claim 1 wherein mounting straps are fixedly applied across the inside of said deflecting plate to extend beyond the outer edge thereof and are formed at their ends with inwardly turned horizontal ears that are overlapped with the outer end portions of said plate mounting brackets, and pivot bolts are extended through the overlapped ears and brackets to hingedly mount the deflector plate for its swinging adjustment.

3. A wind deflector for use on a highway vehicle of the character described having a body formed with a sidewall and a rear end door hinged at its outer vertical edge to the rear end of the sidewall to swing rearwardly and outwardly between closed and open positions; said deflector comprising an elongated wind deflecting plate, transversely curved to present a concaved wind deflecting surface, plate mounting brackets fixed, in vertical spacing, to said sidewall adjacent the rear end corner of the body, securing means provided on said plate adjacent the upper and lower ends thereof, link means hingedly joining said securing means to said mounting brackets for adjustment and support of the deflecting plate with its concaved surface faced forwardly and its outer edge projecting beyond the corner of the body to pick up and deflect slip stream air transversely across the rear end door, and a connecting link secured at its ends to the inner edge portion of the plate and to said door at a point inwardly from the door mounting hinge to establish the normal angle of deflection of the plate when the door is closed and to cause the plate to swing outwardly with the opening of the door.

References Cited in the file of this patent
UNITED STATES PATENTS

| | | |
|---|---|---|
| 891,537 | Graff | June 23, 1908 |
| 2,569,983 | Favre | Oct. 2, 1951 |
| 2,933,344 | Shumaker | Apr. 19, 1960 |